(12) United States Patent
Huang

(10) Patent No.: US 8,698,647 B2
(45) Date of Patent: Apr. 15, 2014

(54) WARNING LAMP

(76) Inventor: Chun-Ming Huang, Taichung (TW)

( * ) Notice: Subject to any disclaimer, the term of this patent is extended or adjusted under 35 U.S.C. 154(b) by 94 days.

(21) Appl. No.: 13/568,579

(22) Filed: Aug. 7, 2012

(65) Prior Publication Data

US 2014/0043169 A1 Feb. 13, 2014

(51) Int. Cl.
*G08B 5/36* (2006.01)
*B60Q 1/26* (2006.01)

(52) U.S. Cl.
CPC .................................. *B60Q 1/2611* (2013.01)
USPC ............... 340/815.73; 340/815.45; 340/471; 340/472; 340/473; 362/157; 362/231; 362/233; 362/234

(58) Field of Classification Search
CPC .................................................. B60Q 1/2611
USPC ............... 340/815.73, 815.45, 471, 472, 473; 362/157, 231–234
See application file for complete search history.

(56) References Cited

U.S. PATENT DOCUMENTS

| 5,294,924 | A | * | 3/1994 | Dydzyk | 340/908.1 |
| 6,086,218 | A | * | 7/2000 | Robertson | 362/157 |
| 7,597,452 | B2 | * | 10/2009 | Jeng et al. | 362/234 |

* cited by examiner

*Primary Examiner* — Tai T Nguyen
(74) *Attorney, Agent, or Firm* — WPAT, P.C.; Anthony King

(57) ABSTRACT

A warning lamp has a base, a luminous module, a lampshade, and a reflector. The luminous module is mounted in the base and is located in a center segment of the base. The lampshade is combined with the base and has a lucent portion that is formed on a sidewall of the lampshade. The reflector is mounted in the lampshade and has a cone portion protruding toward the luminous module, a first surface facing the lucent portion, and a reflective portion formed on the first surface. The light emitted from the luminous module irradiates the reflective portion. The reflective portion reflects the light emitted from the luminous module to pass through the lucent portion. Accordingly, the warning lamp has a luminous effect in a circular form.

8 Claims, 9 Drawing Sheets

WARNING LAMP

BACKGROUND OF THE INVENTION

1. Field of the Invention

The present invention relates to a warning lamp, and more particularly to a warning lamp to provide a luminous effect in a circular form.

2. Description of Related Art

A conventional warning lamp is utilized in construction sites, traffic arteries, or on a vehicle to remind surrounding vehicles or road users to pay more attention. The conventional warning lamp may be mounted on a construction vehicle, a leading vehicle, or a cruiser. The conventional warning lamp may be mounted on a boat to improve safety. The conventional warning lamp may be mounted at top of a traffic cone or at front end of a flashlight to provide warning effect.

With reference to FIG. 9, a conventional warning lamp comprises a base 71, a circuit board 72, a luminous module 73 and a lampshade 74. The base 71 has a base space 711 and a washer 712. The base space 711 is defined in the base 71, and the washer 712 is mounted around the base 71. The circuit board 72 is mounted in the base space 711. The luminous module 73 has a pillar 731 and four luminous elements 732. The pillar 731 is rectangle in cross section and is mounted on the center of the circuit board 72. The luminous elements 732 are mounted on four sidewalls of the pillar 731 respectively, and the luminous elements 732 are connected with the circuit board 72 electrically. The lampshade 74 is combined with the base 71 and presses against the washer 712.

The light emitted from the luminous elements 732 irradiates to provide a surrounding warning effect because the luminous elements 732 are mounted on the sidewalls of the pillar 731. However, the conventional warning lamp needs at least four of the luminous elements 732 to provide a surrounding effect, such that the manufacturing cost of the conventional warning lamp is high.

To overcome the shortcomings, the present invention tends to provide a warning lamp to mitigate or obviate the aforementioned problems.

SUMMARY OF THE INVENTION

The main objective of the invention is to provide an improved warning lamp, which includes a base, a luminous module, a lampshade and a reflector.

The base is cannular and has a first end, a second end opposite to the first end, a base space defined in the base, an inner-surface defined inside the base, a base opening defined at the first end and communicating with the base space, a set portion mounted on the inner-surface and having an end adjacent to the base opening, and a connecting portion mounted at the second end. The connecting portion is preferably a protuberance. The set portion preferably comprises four ribs protruding from the inner-surface.

The luminous module is mounted on the base and has a circuit board supported on the set portion, and a luminous element connected with the circuit board electrically and located in a center segment of the base.

The lampshade is cannular and is combined with the base and has a first end connected with the first end of the base, a second end opposite to the first end of the lampshade, a lampshade space defined in the lampshade and communicating with the base space, a top portion defined on the second end of the lampshade, a sidewall formed around and protruding downward from the periphery of the top portion, and a lucent portion defined at least partially of the sidewall.

The reflector is discoidal and is mounted in the lampshade space and has a first surface facing the luminous module, a cone portion formed on a middle of the first surface and protruding toward the luminous element, and a reflective portion formed on the first surface and being located within the scope of light emitted from the luminous element and facing the lucent portion. The reflector is preferably mounted on the top portion. The cone portion preferably has peak end.

Therefore, the warning lamp in accordance with the present invention provides a luminous effect in a circular form.

Other objects, advantages and novel features of the invention will become more apparent from the following detailed description when taken in conjunction with the accompanying drawings.

DETAILED DESCRIPTION OF PREFERRED EMBODIMENT

Figure 1:
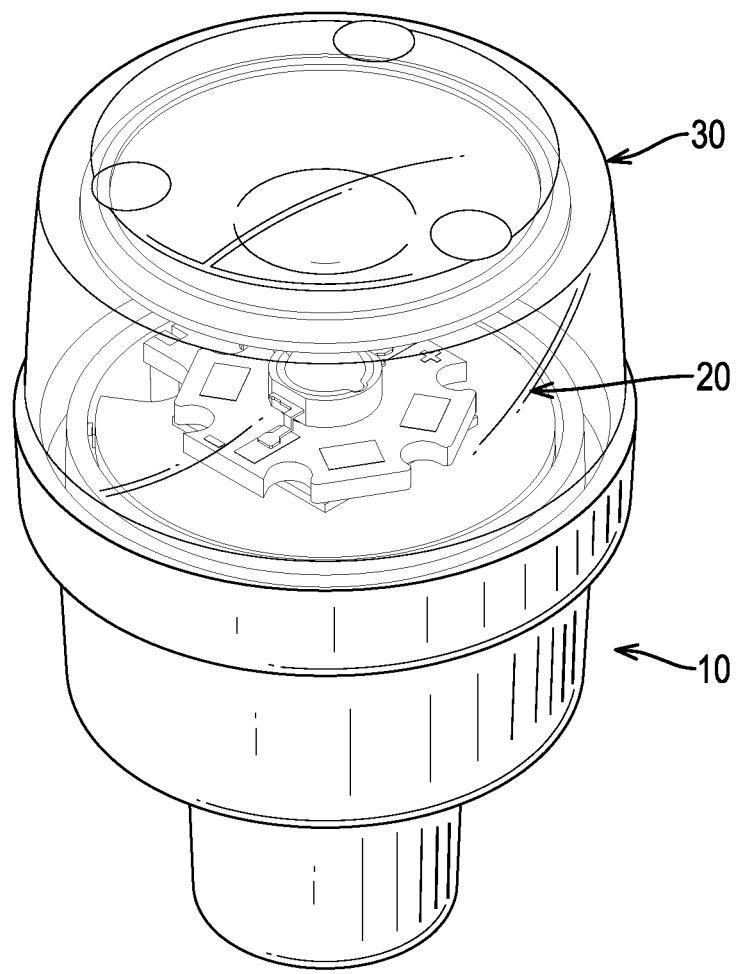
FIG. 1 is a perspective view of a warning lamp in accordance with the present invention.
Figure 2:
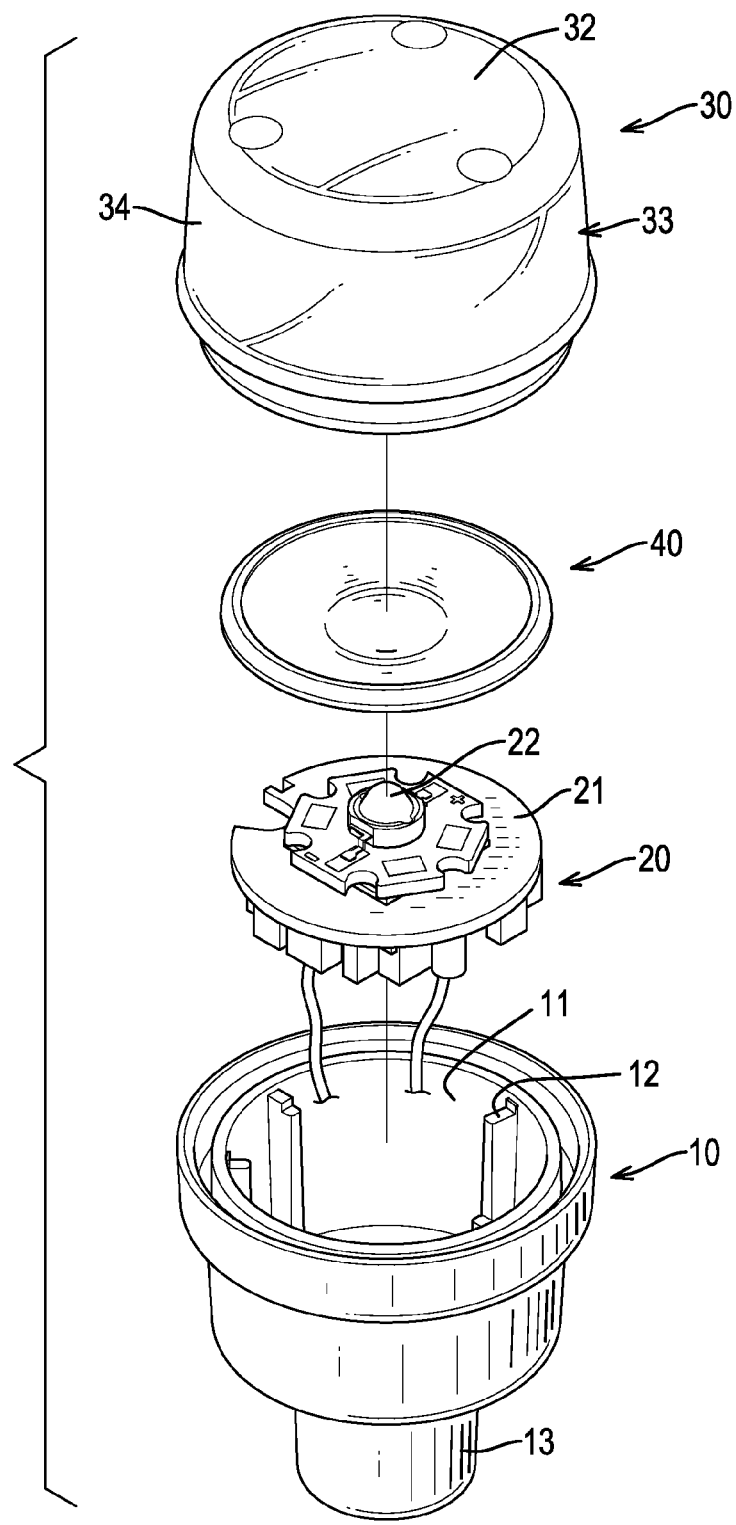
FIG. 2 is an exploded view of the warning lamp in FIG. 1.
Figure 3:
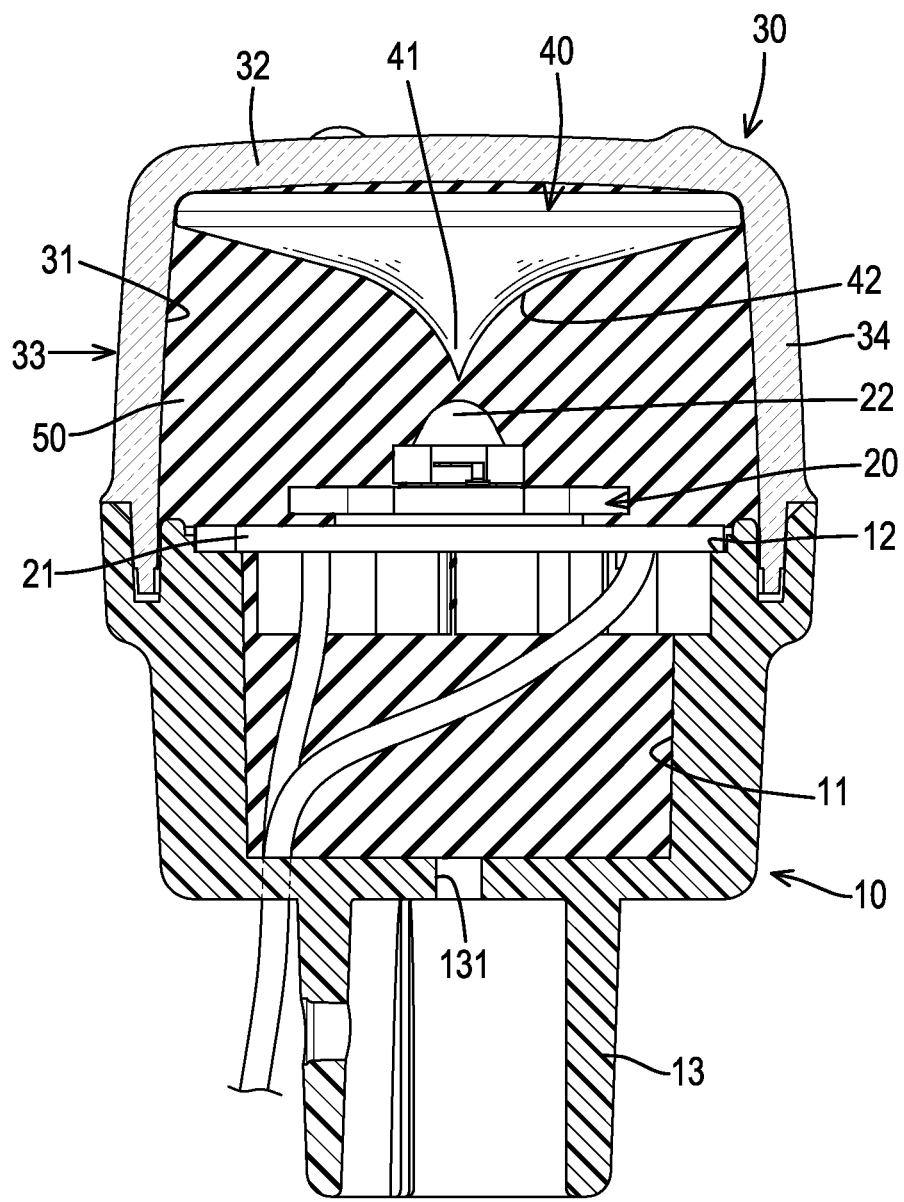
FIG. 3 is a side view in partial section of the warning lamp in FIG. 1.

With reference to FIGS. 1 to 3, a warning lamp in accordance with the present invention comprises a base 10, a luminous module 20, a lampshade 30, and a reflector 40.

The base 10 is cannular and has a first end, a second end opposite to the first end, a base space 11, an inner-surface, a shoulder set 12, and a connecting portion 13. The base space 11 is formed in the base 10 and has a base opening at the first end, such that the inner-surface is inside the base 10. The shoulder set 12 comprises multiple ribs protruding from the inner-surface and an end of each rib is adjacent to the base opening Alternatively, part of the inner-surface that is adjacent to the base opening is notched to form a stepped shoulder set 12. The connecting portion 13 is mounted at the second end and has a through hole 132 communicating an exterior with the base space 11. The connecting portion 13 may be threaded on an exterior or the interior. Alternatively, the connecting portion 13 may be a hollow protuberance.

The luminous module 20 comprises a circuit board 21 and a luminous element 22. The circuit board 21 is supported on the shoulder set 12. The luminous element 22 is connected with the circuit board 21 electrically and is mounted on the circuit board 21 at a side opposite to the connecting portion 13. The luminous element 22 is located in a center segment of the base 10 and may be a light emitting diode (LED).

The lampshade 30 is cannular and comprises a first end, a second end opposite to the first end, a lampshade space 31, a top portion 32, a sidewall 33, and a lucent portion 34. The lampshade space 31 is defined in the lampshade 30 and has a lampshade opening at the first end. The lampshade 30 is combined with the base 10. The base space 11 communicates with the lampshade space 31. The top portion 32 is defined at the second end of the lampshade 30. The sidewall 33 is formed around and protrudes downward from the periphery of the top portion 32 and may be partially or entirely lucent to form the lucent portion 34. Preferably, the whole sidewall 33 and the top portion 32 are lucent.

The reflector 40 is discoidal and is mounted in the lampshade space 31. The reflector 40 is located at the top portion 32. The reflector 40 comprises a first surface, a cone portion 41 and a reflective portion 42. The first surface faces the luminous module 20 and is reflective. The cone portion 41 is formed on a middle of the first surface and protrudes toward the luminous element 22. The cone portion 41 may have a peak end or a curve end. The reflective portion 42 is formed on the first surface and is located within the scope of the light emitted from the luminous element 22 and faces the lucent portion 34.

After the warning lamp is assembled, the warning lamp is inverted such that the connecting portion 13 is uppermost and a waterproof gel 50 is deposited into the base space 11 and the lampshade space 31 between the circuit board 21 and the reflective portion 42, via the through hole 132. With the waterproof gel 50, the luminous module 20 that is securely held a waterproof effect is provided. The waterproof gel 50 may be silicone or epoxy resin. The circuit board 21 connects with a power source electrically.

Figure 4:
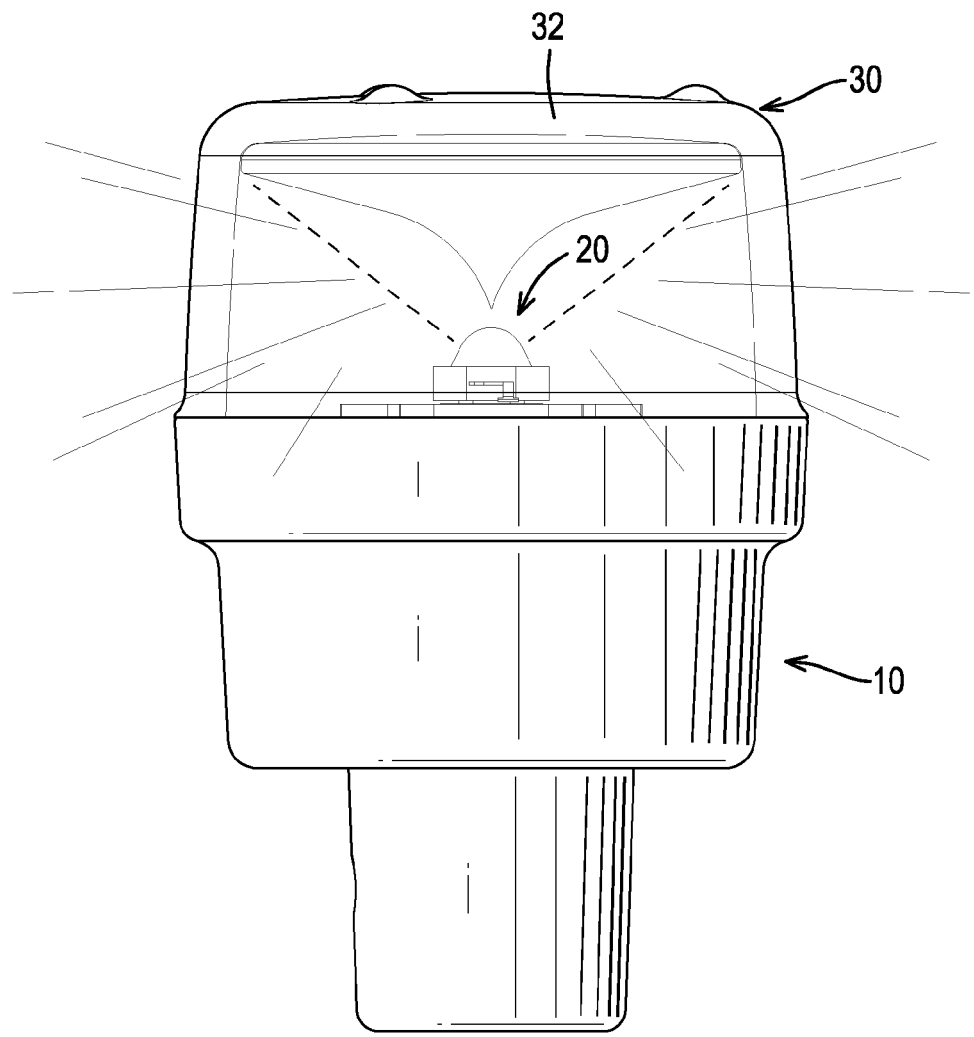
FIG. 4 is an operational side view of the warning lamp in FIG. 1.

With reference to FIGS. 3 and 4, when the luminous element 22 is lighted up, the cone portion 41 makes the light emitted from the luminous element 22 radiate the surroundings with the reflection via the reflective portion 42. The light emitted from the reflective portion 42 passes through the lucent portion 34 to provide a circular luminous effect.

Figure 5:
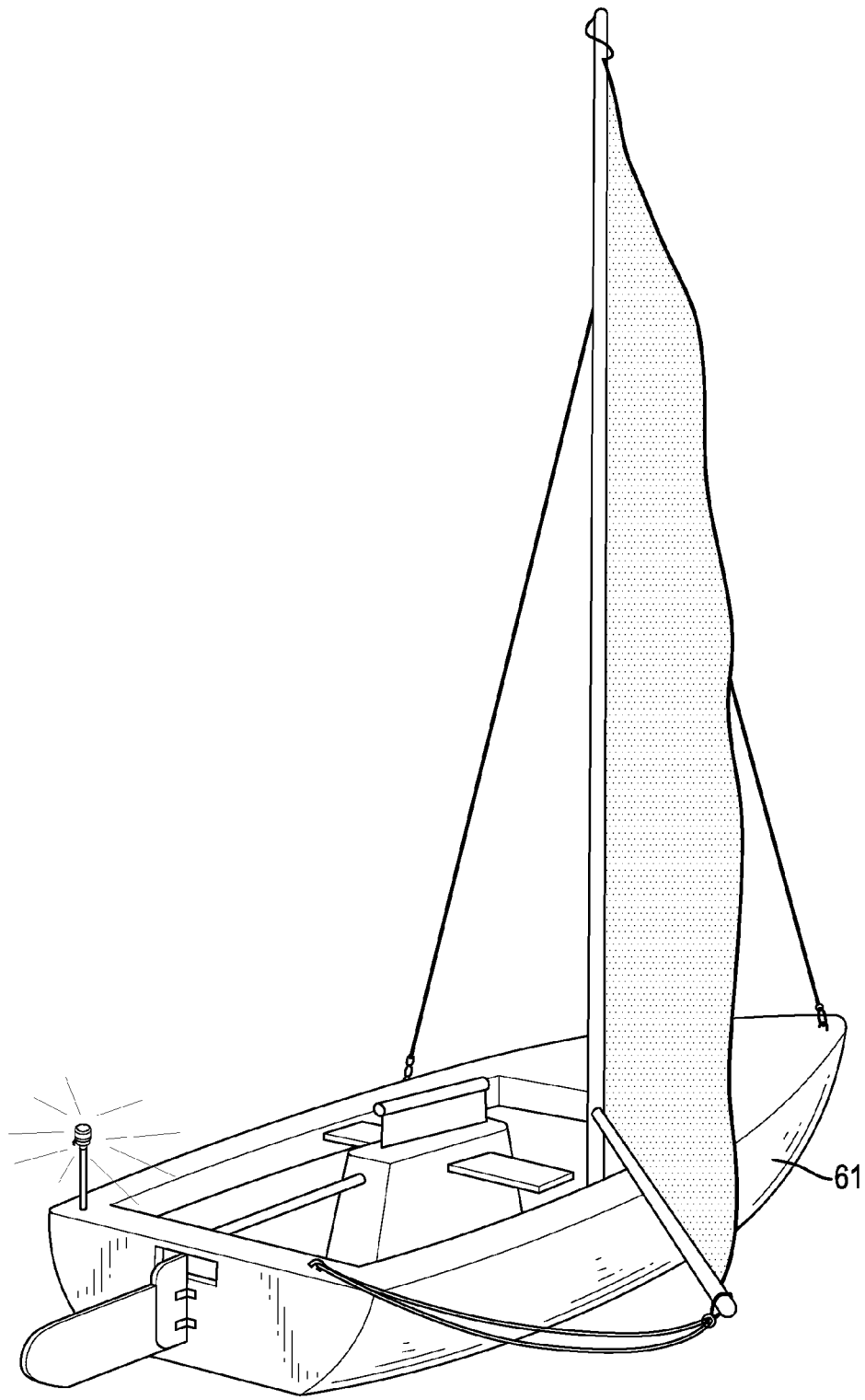
FIG. 5 is an operational perspective view of the warning lamp in FIG. 1 utilized on a boat.
Figure 6:
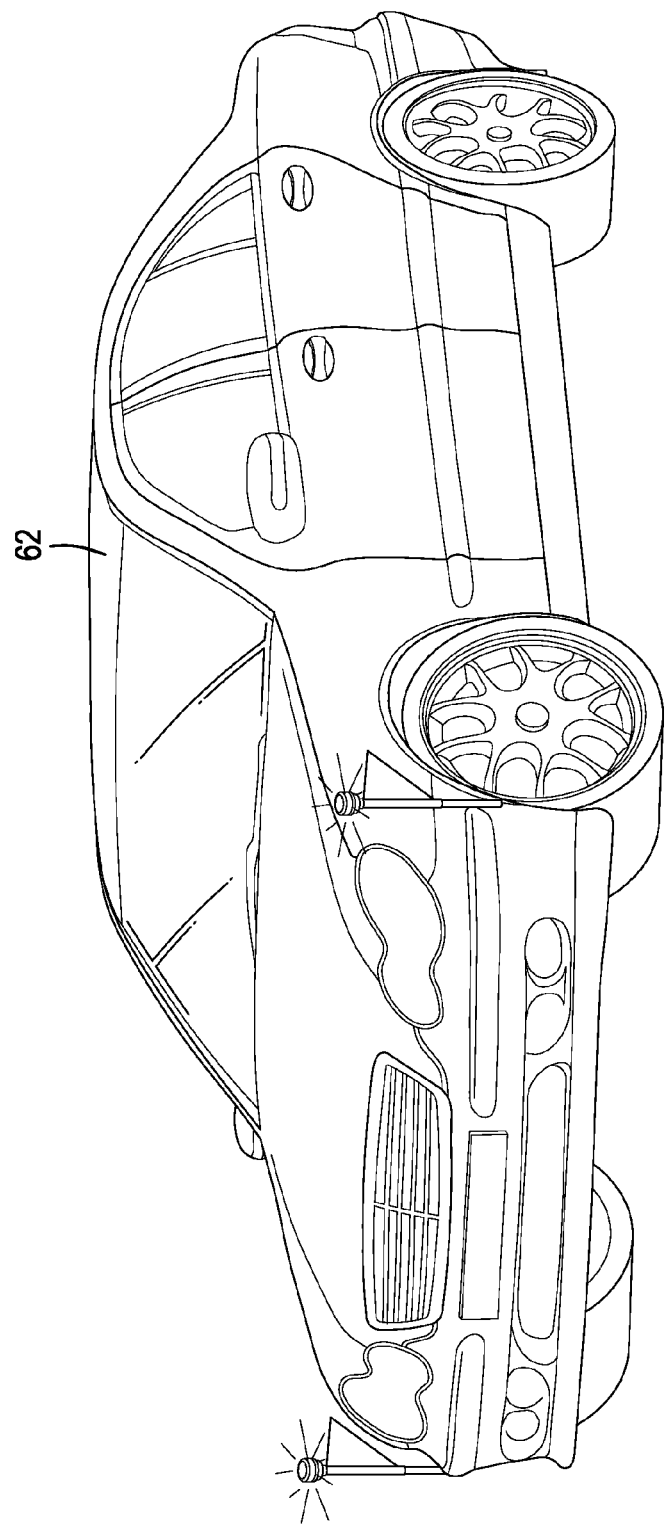
FIG. 6 is an operational perspective view of the warning lamp in FIG. 1 utilized on a vehicle.
Figure 7:
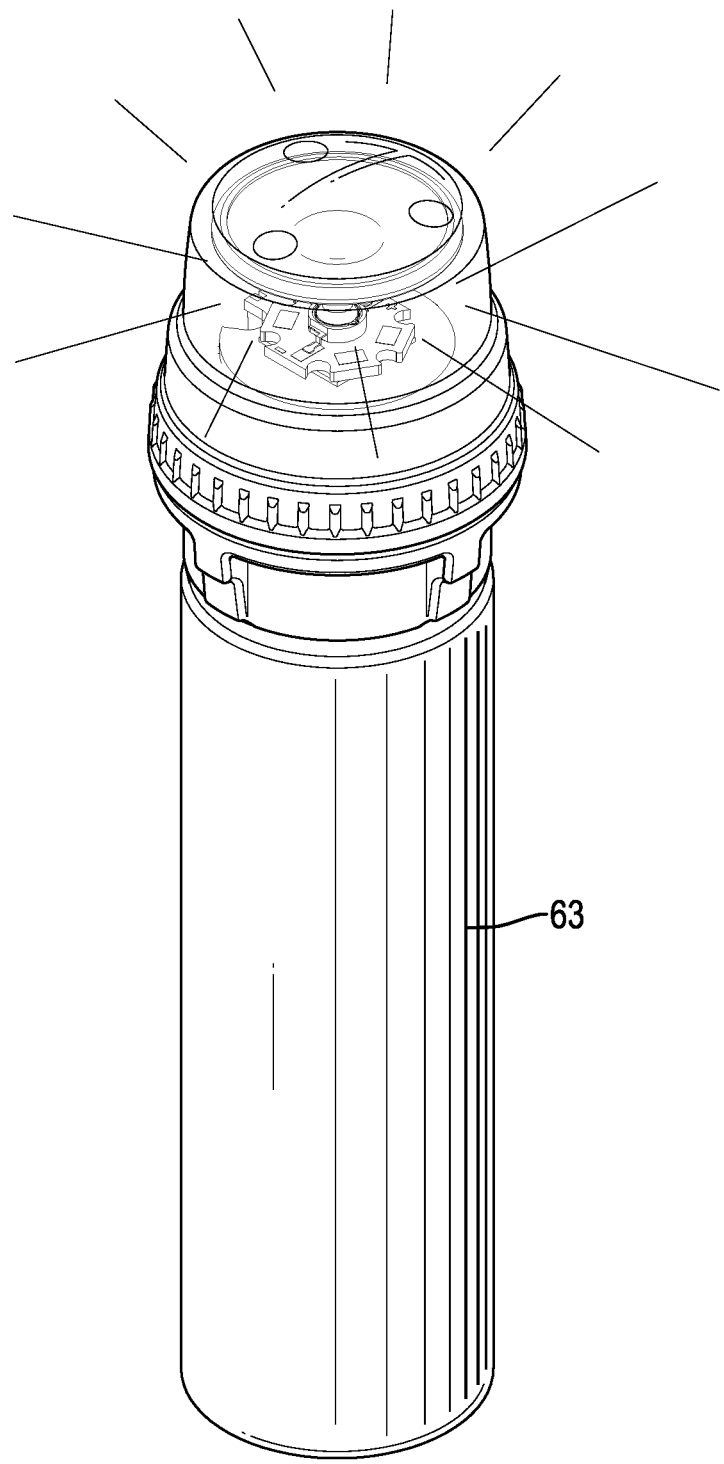
FIG. 7 is an operational perspective view of the warning lamp in FIG. 1 utilized as a flashlight.
Figure 8:
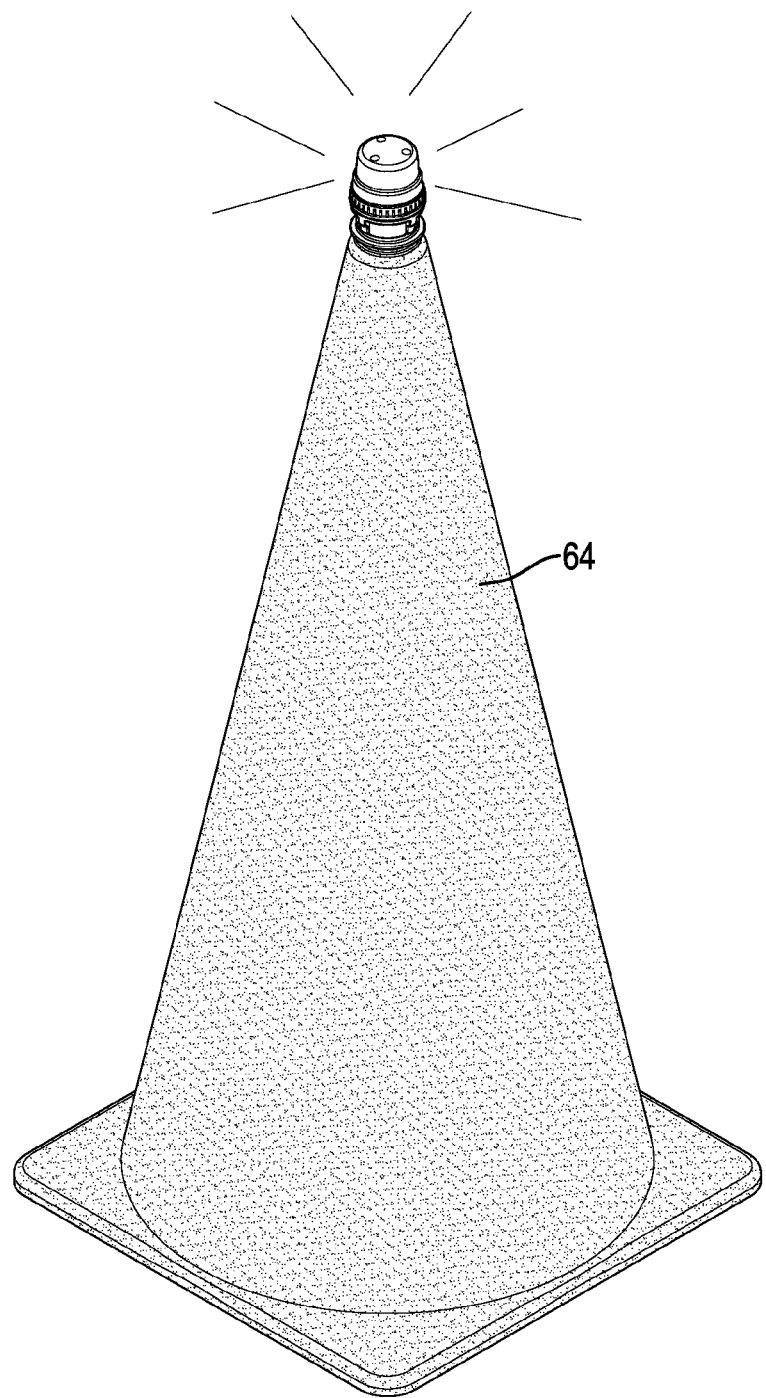
FIG. 8 is an operational perspective view of the warning lamp in FIG. 1 utilized on a traffic cone.
Figure 9:
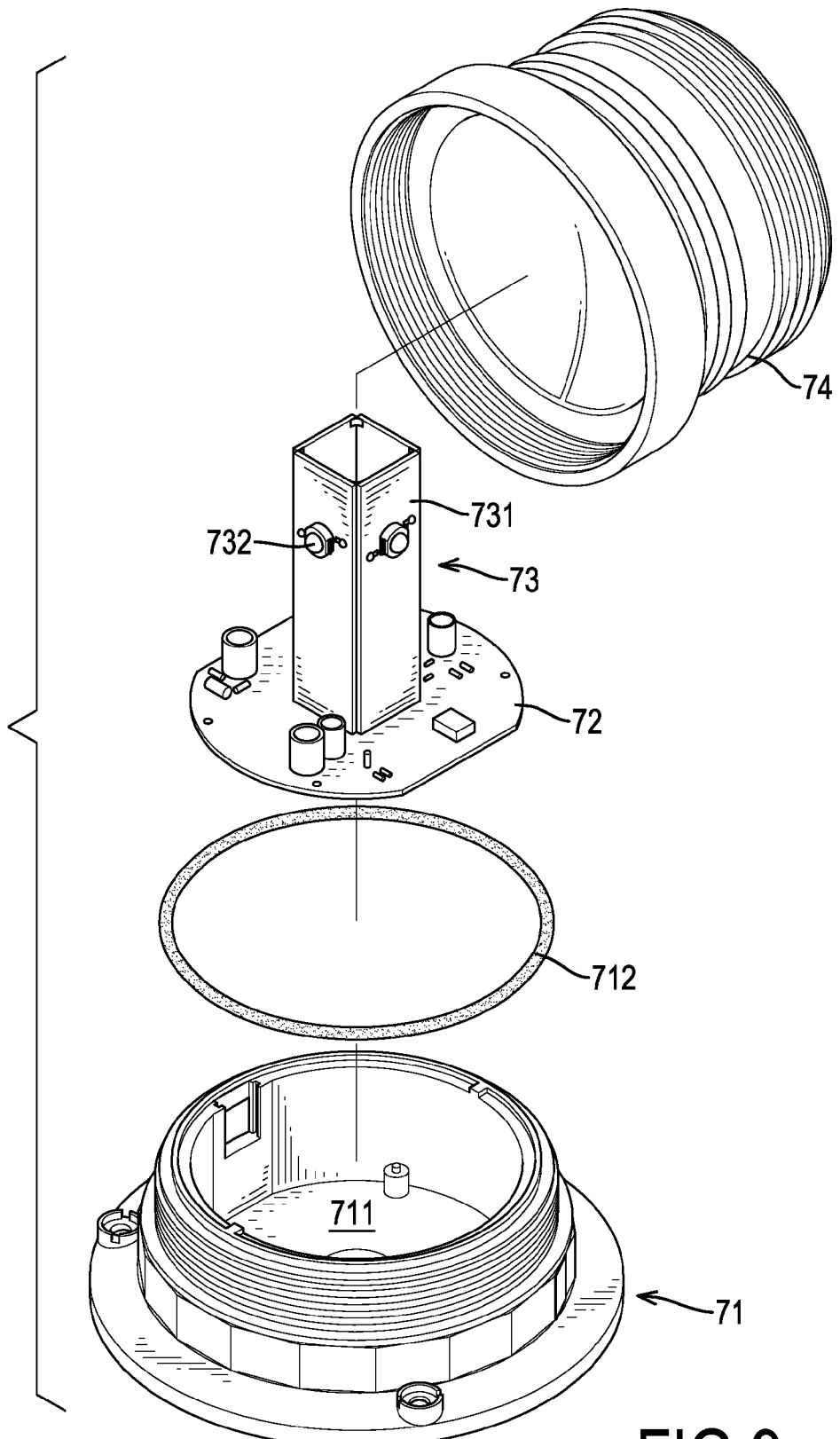
FIG. 9 is an exploded perspective view of a conventional warning lamp.

With reference to FIG. 5, the connecting portion 13 can be mounted on a stern of a boat to improve sailing safety. With reference to FIG. 6, the connecting portion 13 can be mounted on distal tips of a leading vehicle to warn the other vehicles and to lead the following cars. With reference to FIG. 7, the connecting portion 13 can be mounted on a tube to become a flashlight. With reference to FIG. 8, the connecting portion 13 can be mounted on a top of a traffic cone to alert road users of a bumpy road or construction work.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A warning lamp comprising:
   a base being cannular and having
      a first end;
      a second end opposite to the first end;
      a base space defined in the base;
      an inner-surface defined inside the base;
      a base opening defined at the first end and communicating the base space;
      a set portion mounted on the inner-surface and having an end adjacent to the base opening;
      a connecting portion mounted at the second end;
   a luminous module mounted on the base and having
      a circuit board supported on the set portion;
      a luminous element connected with the circuit board electrically and located in a center segment of the base;
   a lampshade being cannular and combined with the base and having
      a first end connected the first end of the base;
      a second end opposite to the first end of the lampshade;
      a lampshade space defined in the lampshade and communicating the base space;
      a top portion defined on the second end of the lampshade;
      a sidewall formed around and protruding downward from the periphery of the top portion;
      a lucent portion defined on the sidewall;
   a reflector being discoidal and mounted in the lampshade space and having
      a first surface facing the luminous module;
      a cone portion formed on a middle of the first surface and protruding toward the luminous element;
      a reflective portion formed on the first surface and located within a scope of light emitted from the luminous element and facing the lucent portion.

2. The warning lamp as claimed in claim 1, wherein the reflector is mounted on the top portion.

3. The warning lamp as claimed in claim 2, wherein the connecting portion is a protuberance.

4. The warning lamp as claimed in claim 3, wherein the set portion comprises four ribs protruding from the inner-surface.

5. The warning lamp as claimed in claim 1, wherein the cone portion has a peak end.

6. The warning lamp as claimed in claim 2, wherein the cone portion has a peak end.

7. The warning lamp as claimed in claim 3, wherein the cone portion has a peak end.

8. The warning lamp as claimed in claim 4, wherein the cone portion has a peak end.

* * * * *